United States Patent
Gao

(10) Patent No.: US 9,672,678 B2
(45) Date of Patent: Jun. 6, 2017

(54) METHOD AND SYSTEM OF USING IMAGE CAPTURING DEVICE FOR COUNTERFEIT ARTICLE DETECTION

(71) Applicant: DATALOGIC ADC, INC, Eugene, OR (US)

(72) Inventor: Wenliang Gao, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 52 days.

(21) Appl. No.: 14/739,890

(22) Filed: Jun. 15, 2015

(65) Prior Publication Data

US 2016/0364936 A1    Dec. 15, 2016

(51) Int. Cl.

| | |
|---|---|
| *G06K 9/00* | (2006.01) |
| *G07D 7/128* | (2016.01) |
| *H04N 5/33* | (2006.01) |
| *H04N 9/04* | (2006.01) |
| *G06K 9/46* | (2006.01) |
| *G06K 9/68* | (2006.01) |
| *G06T 7/90* | (2017.01) |

(52) U.S. Cl.
CPC .......... *G07D 7/128* (2013.01); *G06K 9/4661* (2013.01); *G06K 9/6857* (2013.01); *G06T 7/90* (2017.01); *H04N 5/33* (2013.01); *H04N 9/045* (2013.01); *G06K 2209/01* (2013.01); *G06K 2209/015* (2013.01); *G06T 2207/10008* (2013.01); *G06T 2207/10024* (2013.01)

(58) Field of Classification Search
CPC combination set(s) only.
See application file for complete search history.

(56) References Cited

U.S. PATENT DOCUMENTS

| | | |
|---|---|---|
| 5,607,040 A | 3/1997 | Mathurin |
| 5,915,518 A | 6/1999 | Hopwood et al. |
| 6,441,379 B1 | 8/2002 | Osgood et al. |
| 6,883,706 B2 | 4/2005 | Mastie et al. |
| 7,182,197 B2 | 2/2007 | Nago et al. |
| 7,187,795 B2 | 3/2007 | Jones et al. |
| 7,256,874 B2 | 8/2007 | Csulits et al. |

(Continued)

OTHER PUBLICATIONS

International Search Report and Written Opinion dated Sep. 16, 2016 for International Patent Application No. PCT/US2016/037514, 11 pages.

*Primary Examiner* — Alex Liew
(74) *Attorney, Agent, or Firm* — Shook, Hardy & Bacon L.L.P.

(57) ABSTRACT

A device, system, and method of detecting counterfeit articles are provided. The method includes receiving article identifying information associated with a test article, using the article identifying information to retrieve an authentic article image associated with the test article from an image storage database, scanning the test article to capture one or more images of the test article under different wavelength illuminations, and displaying the one or more test article images and the authentic article image to allow comparison of the test article and the associated authentic article. Additionally, multiple wavelength emitting elements may be located within an image-capturing device, to provide alternate illuminations of the test article, allowing alternating capture of images highlighting different security features for providing a superimposed image. A system of counterfeit article detection is also provided.

17 Claims, 12 Drawing Sheets

(56) References Cited

U.S. PATENT DOCUMENTS

| | | |
|---|---|---|
| 7,451,913 B2 | 11/2008 | Blair et al. |
| 7,684,607 B2 | 3/2010 | Joshi et al. |
| 7,724,938 B2 | 5/2010 | Pareskevakos |
| 7,815,109 B2 | 10/2010 | Silverbrook et al. |
| 7,918,557 B2 | 4/2011 | Iwanaga et al. |
| 7,948,551 B2 | 5/2011 | Hasegawa |
| 7,991,186 B2 | 8/2011 | Rudaz et al. |
| 8,094,917 B2 | 1/2012 | Liu et al. |
| 8,162,125 B1 * | 4/2012 | Csulits .................. G07D 7/0033 194/206 |
| 8,346,610 B2 | 1/2013 | Mennie et al. |
| 8,644,585 B1 | 2/2014 | Mennie et al. |
| 9,004,359 B2 | 4/2015 | Shearin et al. |
| 2001/0040994 A1 | 11/2001 | Jang et al. |
| 2003/0107004 A1 * | 6/2003 | Leach ..................... G07D 7/12 250/372 |
| 2004/0081332 A1 * | 4/2004 | Tuttle ................. G06K 9/00442 382/100 |
| 2008/0106726 A1 | 5/2008 | Park |
| 2008/0187170 A1 | 8/2008 | Matsubayashi |
| 2010/0147942 A1 | 6/2010 | Silverbrook et al. |
| 2012/0187185 A1 | 7/2012 | Sayan |
| 2012/0273698 A1 | 11/2012 | Gudgell et al. |

\* cited by examiner

METHOD AND SYSTEM OF USING IMAGE CAPTURING DEVICE FOR COUNTERFEIT ARTICLE DETECTION

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to fixed scanners and image capturing devices for counterfeit article detection.

BACKGROUND

Counterfeit article detection by imaging related security devices is critical for preventing use of counterfeit articles, such as counterfeit currency or documents. Traditional counterfeit detection relies on a standalone verifier with partial or whole article images displayed on an LCD screen without reference images provided concurrently. Without stored reference images, it is difficult for a cashier, or other person involved with a transaction, even those with substantial training in counterfeit article identification, to make an accurate detection. With regard to counterfeit currency, an added difficulty is that there are currently many different versions of certain currency bills of the same type in circulation. Other challenges exist for identification of counterfeit currency in particular, including when an active bill, such as a $1 bill (USD), is altered to become a higher value bill. In this case, many of the security features embedded in the original $1 bill are still present and valid, making the counterfeit currency harder to detect. As a result, an improved device, method, and system for counterfeit article detection is needed.

SUMMARY

Aspects of the invention are defined by the claims below, not this summary. A high-level overview of various aspects of the invention is provided here for that reason, to provide an overview of the disclosure, and to introduce a selection of concepts that are further described below in the detailed-description section. This summary is not intended to identify key or essential features of the claimed subject matter, nor is it intended to be used as an aid in isolation to determine the scope of the claimed subject matter. The scope of the invention is defined by the claims.

Embodiments herein are directed to a device, method, and system for counterfeit article detection utilizing a comparison of captured images of a test article and stored images of a corresponding authentic article. In aspects of the invention, an image capturing device (ICD) may be provided, and the ICD may include one or more infrared, red, and/or ultraviolet wavelength emitting elements. The infrared, red, and/or ultraviolet wavelength emitting elements may be operated and/or controlled independently to provide illumination of an article (e.g., object, document, or currency/bank note, etc.) under different wavelengths to highlight various security features embedded or present within the article. The ICD may include an imager configured to capture images of articles illuminated under infrared, red, and/or ultraviolet (or other optical wavelengths) light, providing one or more images of the article, or a sequence of rapidly generated images highlighting different security features when the article is illuminated under the different wavelengths of light. The device may be configured to receive article identifying information (e.g., currency information if the article is a currency note), the article identifying information used to retrieve stored images from a reference database for comparison with the one or more captured images of the test article. In further aspects of the invention, the infrared, red, and/or ultraviolet images may be captured and displayed in alternating fashion at a frame rate that allows all of the security features to be viewed concurrently by a user, due to the rapid alternating presentation of the different images, which creates a superimposed image. Accordingly, in embodiments provided herein, a single imager and/or camera chamber may be utilized to capture all of the security features without having multiple image capturing components working concurrently to produce separate images.

In a first aspect of the invention, a method of detecting a counterfeit article with a scanning device is provided. The method comprises receiving article identifying information associated with a test article, receiving one or more comparison images of an authentic article associated with the test article from an image storage database, scanning the test article to capture one or more test images of the test article, and providing the one or more test images and the one or more comparison images for display.

In a second aspect of the invention, a method of detecting counterfeit articles with an image-capturing device is provided. The method comprises receiving article identifying information associated with a test article, receiving one or more comparison images of an authentic article associated with the test article from an image storage database, pulsing one or more infrared emitting elements and one or more ultraviolet emitting elements positioned in the image capturing device in alternating fashion, capturing infrared images and ultraviolet images of the test article in the alternating fashion in accordance with the respective pulsing of the infrared emitting elements and the ultraviolet emitting elements, displaying the infrared images and the ultraviolet images in alternating fashion, and displaying at least one of the one or more comparison images.

In a third aspect of the invention, a system for detecting counterfeit articles is provided. The system comprises an image capturing device having one or more infrared emitting elements and one or more ultraviolet emitting elements which are configured to be operated independently, the image capturing device configured to capture images under infrared and ultraviolet illumination in alternating fashion, an image storage database for storing one or more images of authentic articles, an input device for receiving article identifying information associated with a test article, the article identifying information used for retrieving an image of an associated authentic article from the image storage database, and a display device for displaying one or more of the captured infrared images and the captured ultraviolet images of the test article and for displaying the image of the associated authentic article for comparison.

Aspects of the present invention are sometimes described in relation to currency notes and/or bank notes, but the invention is not limited only to these items. The device, system, and methods for counterfeit detection described herein may be used for verification of any number and scope of articles, including objects, items, currency (new and old), and/or documents in which embedded light wavelength based security features are present (e.g., infrared or ultraviolet visible security features). In that regard, the invention may be utilized for the following non-limiting list of articles: domestic and foreign currency, bank notes, coupons, miscellaneous vouchers, certified documents, legal documents, identification documents, government issued documents, food stamps, bank checks, and other articles for which verification of embedded security features is desired.

A counterfeit article, object, or item is any one that is capable of being inauthentic (copied, modified, and/or created) due to fraud, creation, unauthorized copying or modification, or other alteration. A test article is an article as described above for which authenticity verification is desired. A "captured image" of a test article is one that is captured for verification and comparison against an authentic article. An authentic article image is an image of an article associated with the test article, which is identified and retrieved for comparison with and verification of the test article. In embodiments, an authentic article is an article that has been determined to be authentic.

BRIEF DESCRIPTION OF THE DRAWINGS

Illustrative embodiments of the present invention are described in detail below with reference to the attached drawing figures, which are incorporated herein by reference, wherein.

DETAILED DESCRIPTION

Figure 1:
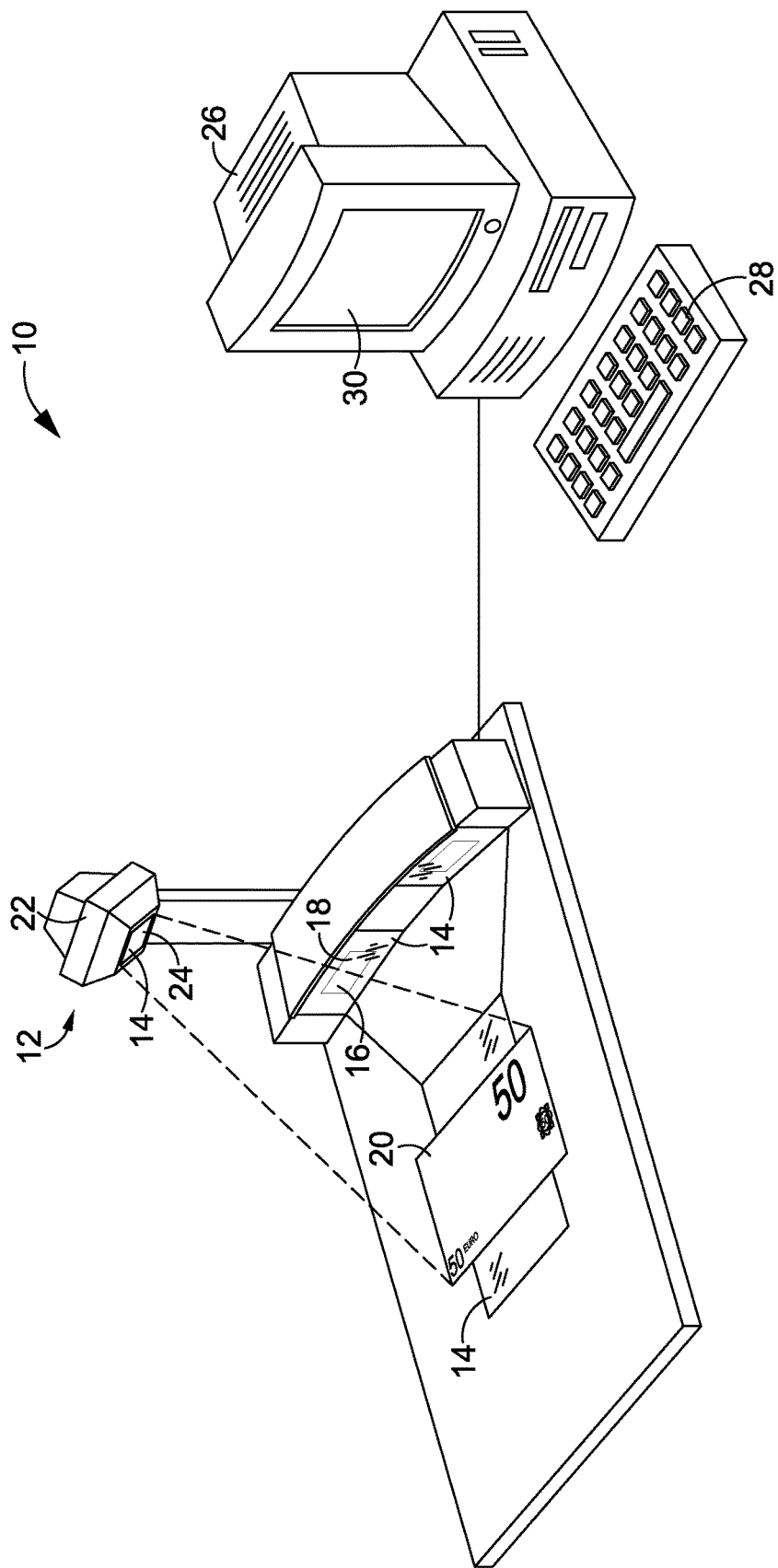
FIG. 1 is an exemplary device for counterfeit article detection, in accordance with an aspect of the present invention.

The subject matter of aspects of the present invention is described with specificity herein to meet statutory requirements. However, the description itself is not intended to limit the scope of the claims. Rather, the claimed subject matter might be embodied in other ways to include different elements or combinations of elements, similar to the ones described in this document, and in conjunction with other present and/or future technologies. Terms should not be interpreted as implying any particular order among or between various steps disclosed unless and except when the order of individual steps is explicitly described.

In a broad aspect, a device, method, and system for counterfeit article detection is provided. Generally, the device includes an image-capturing component for capturing images of a test article (an article to be verified for authenticity) and a database for storing images of associated authentic or pre-authenticated articles for retrieval and comparison with scanned or captured images of the test article. The device may include a scanning or image-capturing component that includes one or more wavelength emitting elements (e.g., red wavelength, infrared wavelength, ultraviolet wavelength, etc.), for illuminating different optical aspects, and the associated security features, of an article to be verified. The device may be configured to capture separate images of the article with the different optical aspects highlighted by the different wavelengths emitted at different times. In this regard, the wavelength emitting elements may be controlled and activated independently to allow alternating capture of images of the article with different highlighted visual aspects (e.g., ultra violet security feature illumination, standard visual design, etc.). The captured images with differing optical aspects may be communicated to a display portion for display to a user, and the display of the images may occur in alternating fashion to superimpose the different security features into a single image viewable by a user of the device. In this respect, the various images may be captured by a single imager in a single camera chamber of an image capturing device, rather than in multiple chambers each having separate emitting and capturing components segmented into each chamber. This reduces cost of manufacture, decreases the space required for the device, and provides an accurate analytical tool for a user for determining the authenticity of articles or other items, objects, or documents in which embedded light wavelength activated security features are present.

In additional aspects, the device may be configured to receive article-identifying information (e.g., article name, year, etc.), from a user or other source, to locate authentic or pre-authenticated image(s) of the article in the reference image database. In the example of a currency note, the article identifying information may be a currency date, currency type, currency denomination, currency nationality, or some other currency distinguishing information. The input may be received through an input component (e.g., a keyboard, mouse, touch-interface, graphical user-interface, voice-input component, or other data input device), and the article identifying information may be used to retrieve from a reference database one or more reference images of the associated authentic article for display and comparison. A display may be provided to display the captured images and the reference images for comparison by a user of the device. The display portion providing the captured images may be configured to display in alternating fashion each of the captured images highlighting the different security features (e.g., images under red wavelengths, images under infrared wavelengths, images under ultraviolet wavelengths, etc.) on top of each other to form one superimposed image that shows each of the captured security features in the separate images captured by the image capturing component in the device. The superimposed image may then be displayed alongside the reference image of the authentic article for comparison.

Referring now to FIG. 1, an exemplary device 10 for counterfeit article detection is provided, in accordance with an aspect of the present invention. In FIG. 1, an image capturing device 12 (which in this exemplary aspect is a scanner) is provided that includes multiple image capturing chambers 14 which can each be fitted with one or more image capturing components 16 and one or more wavelength emitting elements 18 which can be controlled to independently illuminate various security features of a currency test note 20 (the currency note is but one exemplary article for verification with the device 12; others may be verified as well). In this respect, there are multiple chambers 14 at which the article illumination and image capture may occur, although the device 10 may be configured to allow all image capturing to occur through one selected chamber, as discussed herein. As shown in FIG. 1, a top-down scanning component 22 is in operation to capture an image of the currency note 20 to be analyzed for counterfeit security features. The top-down scanning component 22 includes a window 24 through which multiple wavelength emitting elements (not visible in FIG. 1; see FIG. 7), which may be Light Emitting Diodes ("LEDs"), can illuminate the currency note 20, and also through which an image may be received and captured by an image capturing component (e.g., imager) which receives the reflected or stimulated wavelengths from the different light emitting elements that illuminate various optical features of the currency note 20. The captured images may be transmitted from the scanner 22 to a computing device 26 which may contain a reference database of stored currency images, and other article images, for comparison with the tested currency note 20.

As shown in FIG. 1, the computing device 26 may include an input device 28 (shown in FIG. 1 as a keyboard; the input device may alternatively be a touch screen, a graphical user-interface, a touch-pad, etc.) for receiving article identifying information, such as, in the example of currency notes, a year of the currency production (e.g., 2002, 2004, etc.), a nationality or currency zone designation (e.g., euros, yen, USD, etc.), and/or a currency denomination (1, 20, 100, etc.), which may be used for retrieving one or more stored reference images of authentic, or pre-authenticated, currency notes for comparison with the captured images of the currency test note 20. The computing device 26 further includes a display 30 for displaying one or more captured images of the currency test note 20 from the image-capturing device 12 and one or more reference images of associated authentic currency images from the stored currency image database.

Figure 2:
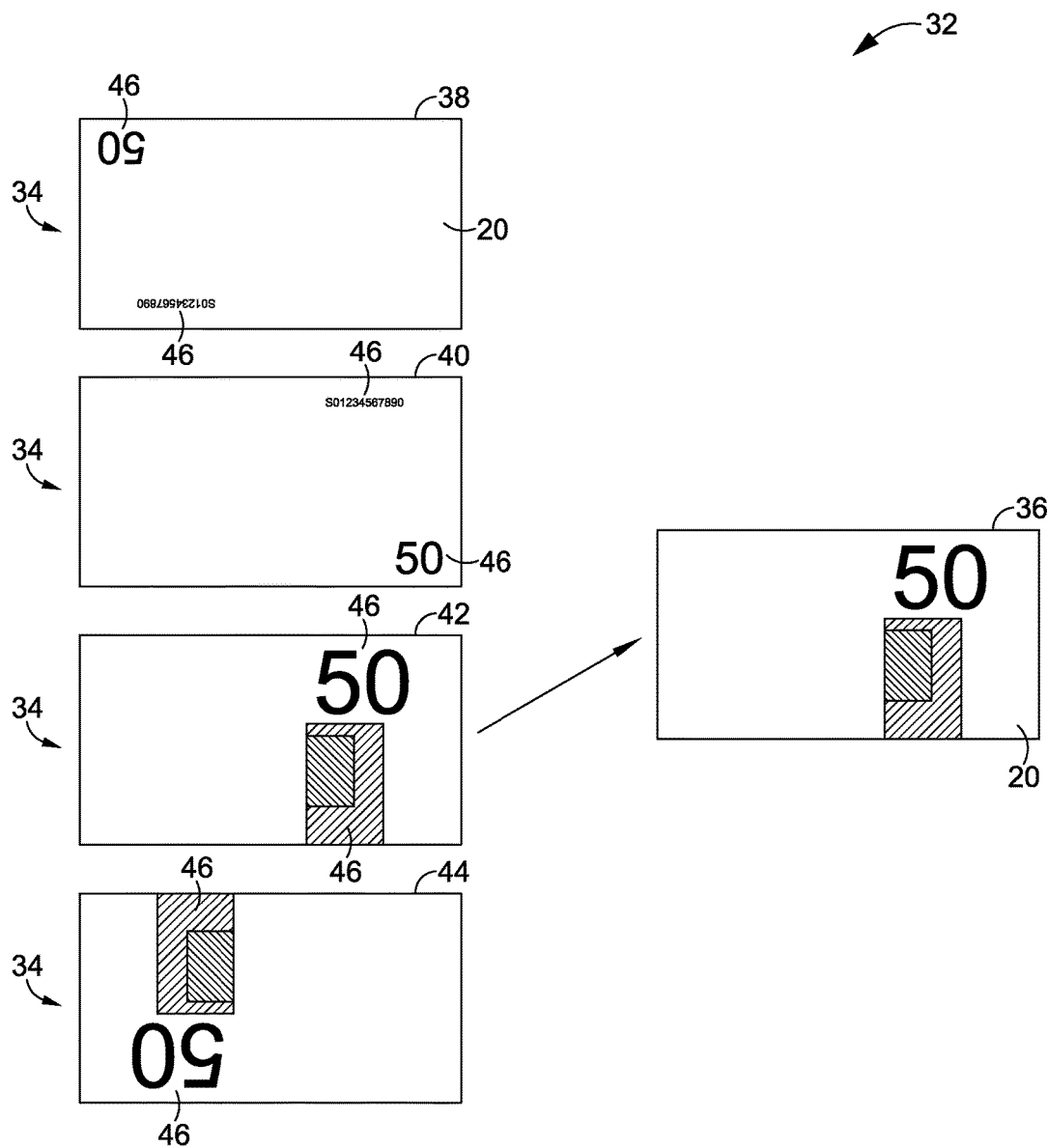
FIG. 2 is an example of a first displayed currency comparison associated with an image capturing device for counterfeit article detection, in accordance with an aspect of the present invention.

Referring now to FIG. 2, a first displayed currency comparison 32 associated with an image capturing device for counterfeit currency detection is provided, in accordance with an aspect of the present invention. In FIG. 2, a series of reference images 34 of first and second sides of the currency test note 20 is presented on the left side of FIG. 2, and a captured image 36 to be compared with one of the reference images 34 is provided on the right side of FIG. 2. The reference images 34 are retrieved from a reference database containing authentic article images, including authentic currency images associated with the captured image 36, using article identifying information. These images 34, 36 may be presented on a display connected to an image capturing device, or on separate displays, or visually in any number of other ways that allow review by a user of the device. In FIG. 2, one or more captured images 36 of the currency test note are presented for comparison with the reference images 34. The captured image 36 in FIG. 2 is generated from an infrared wavelength emission and associated image capture by the image-capturing device, to show infrared wavelength visible security features on the currency test note 20. The four reference images 34 include a top-down first side first image 38, a top-up first side second image 40, a top-up second side third image 42, and a top-down second side fourth image 42 of an authentic version of the currency test note 20. The captured image 36, when compared with the four reference images, matches the third reference image 42. Thus, a user testing the currency test note need only compare the third image reference image 42 of the currency test note 20 to the captured image 36 for verification. As shown, with this being an infrared wavelength illuminated feature comparison, the required infrared security features 46 are present on the currency test note 20, as shown by the third reference image 42 and the captured image 36 being the same. If any of the reference images 34 associated with the currency test note 20 do not match the captured image 36, the currency test note 20 may be identified as a potential counterfeit.

Figure 3:
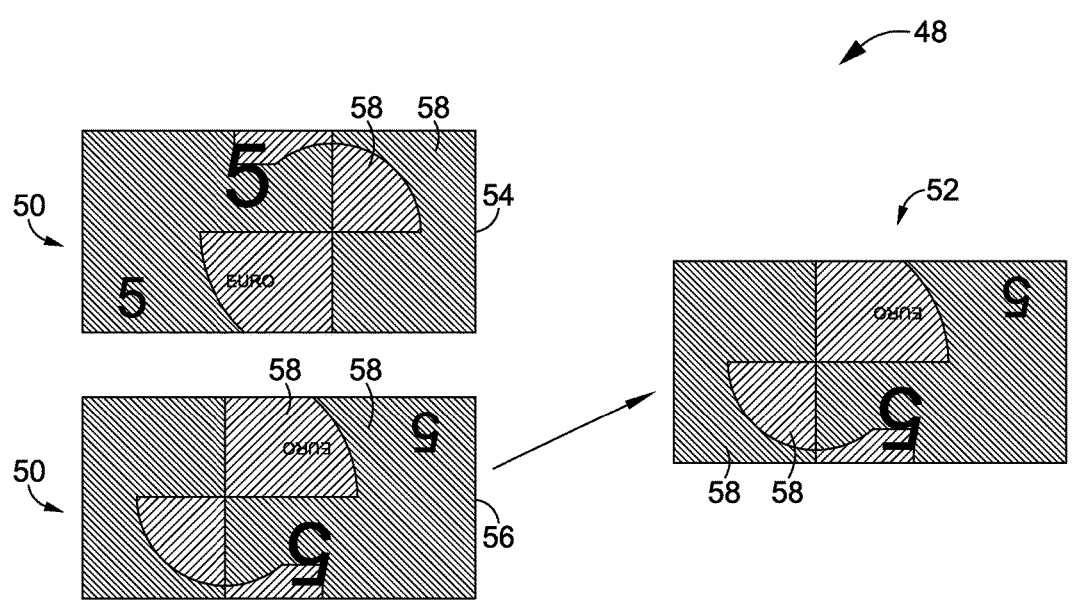
FIG. 3 is an example of a second displayed currency comparison associated with an image capturing device for counterfeit article detection, in accordance with an aspect of the present invention.

Referring now to FIG. 3, a second displayed currency comparison 48 associated with an image-capturing device for counterfeit article detection is provided, in accordance with an aspect of the present invention. In FIG. 3, a similar comparison as FIG. 2 is provided, with reference images 50 on the left, and an associated captured image 52 on the right. The reference images 50 of the currency note to be verified include images of the first and second sides of the note, and specifically, the reference images 50 include a top-up first side first image 54 and a top-down first side second image 56 of the currency note. The captured image 52 corresponds to the second image 56 of the reference images 50. The captured image 52 is captured while the note is under illumination from ultraviolet emitting elements in an image-capturing device. The reflected ultraviolet wavelengths provide illumination of the ultraviolet visible security features 58, for comparison with the reference images 50. This clearly shows the proper ultraviolet security features 58. The captured image 52 in FIG. 3 features the same illuminated security features 58 as the reference images 50, which are visible under ultraviolet light. As with FIG. 2, if the captured image 52 associated with the currency test note images 50 does not match one of the reference images 50, the currency test note may be identified as a potential counterfeit. In this respect, because a clear visual comparison of the illuminated security features is possible, minimal training and/or technological understanding is required for a user attempting to identify counterfeit currency with the device.

Figure 4:
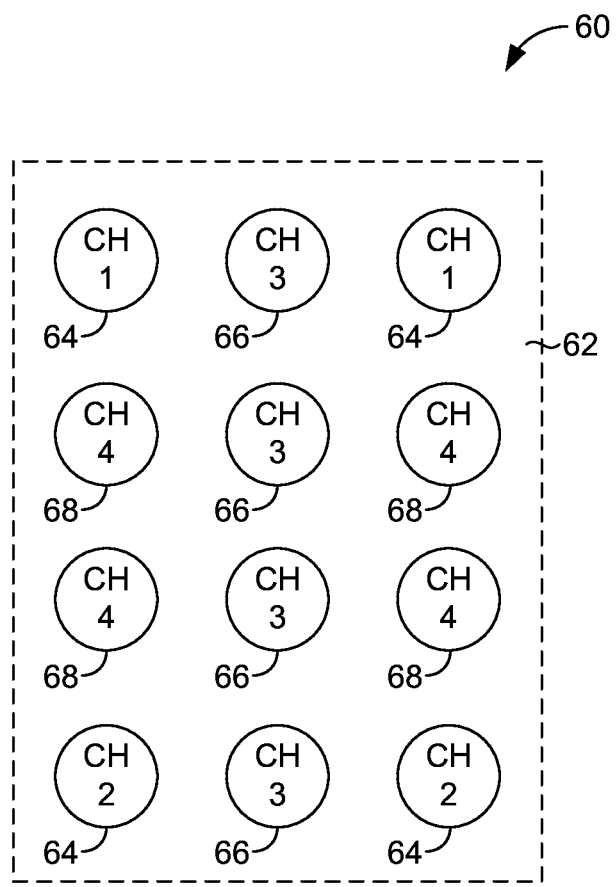
FIG. 4 is an exemplary configuration of multiple wavelength emitting elements which are positioned in a single image capturing device for counterfeit article detection, in accordance with an aspect of the present invention.

Referring now to FIG. 4, an exemplary configuration 60 of multiple light emitting elements which are positioned in a single image capturing device for counterfeit article detection is provided, in accordance with an aspect of the present invention. In the exemplary configuration shown in FIG. 4, three different wavelength emitting elements, which may in one aspect be LEDs, are organized in a single chamber of an image capturing device for use in providing illumination of a currency test note under different wavelengths. In FIG. 4, a wavelength emitting element mount 62 is provided for organizing the multiple wavelength emitting elements. The elements include first red wavelength emitting elements (CH1/CH2) 64, second infrared wavelength emitting elements (CH3) 66, and third ultraviolet wavelength emitting elements (CH4) 68. In this regard, the first emitting elements 64 may correspond to the red wavelength optical range (e.g., a 660 nanometer (nm) wavelength) for barcode reading, the second emitting elements 66 may correspond to an infrared wavelength optical range (e.g., 850 nm wavelength), and the third emitting elements 68 may correspond to an ultraviolet wavelength optical range (e.g., 365 nm wavelength). Multiple configurations of the light emitting elements 64, 66, 68 on the mount 62, as well as different numbers and ratios of the light emitting elements 64, 66, 68, are possible, allowing various illumination options for articles towards which the image capturing device is directed for article authenticity verification.

Figure 5:
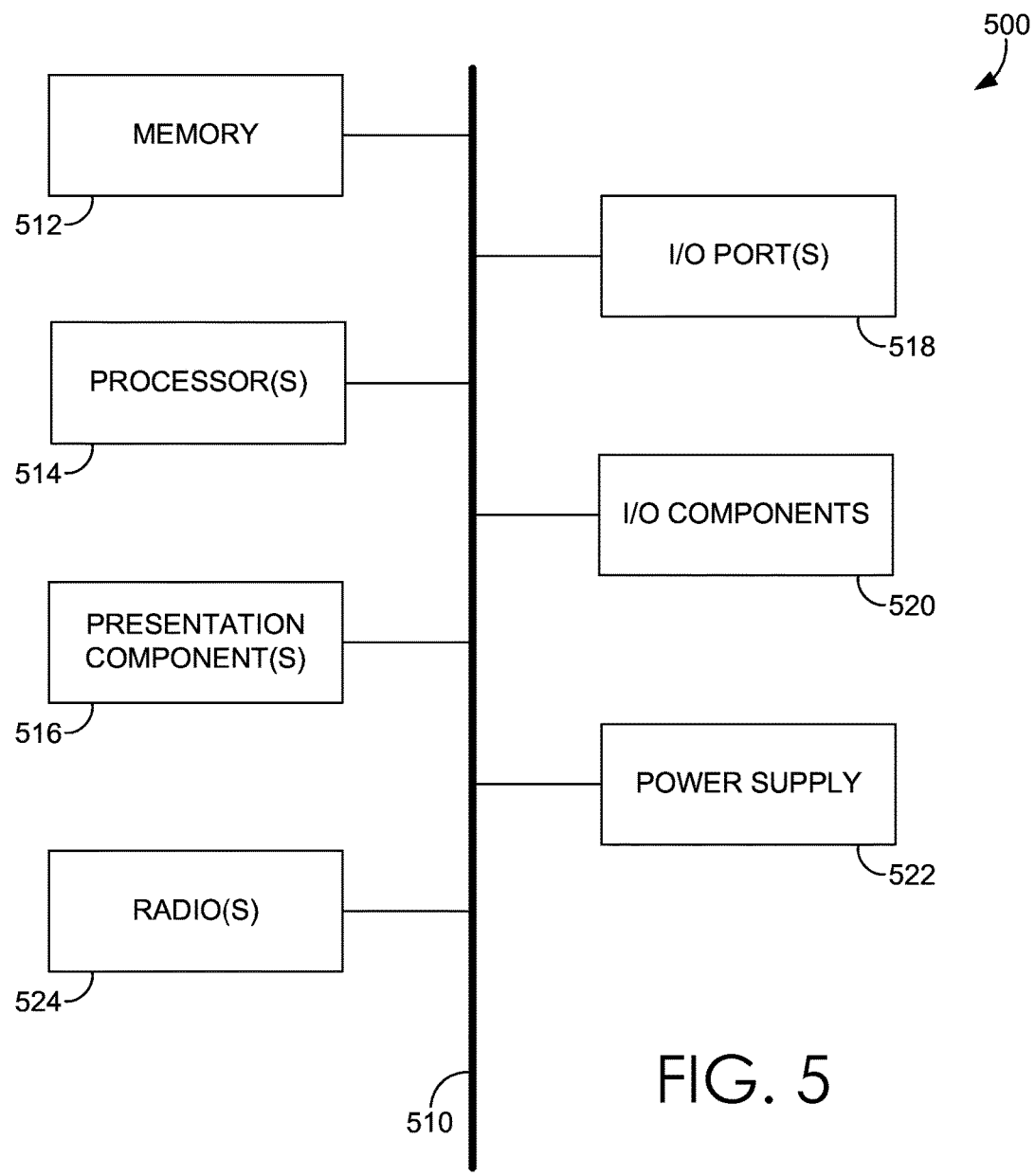
FIG. 5 is an exemplary computing environment associated with an image capturing device for counterfeit article detection, in accordance with an aspect of the present invention.

Referring now to FIG. 5, an exemplary computing environment for an image-capturing device for counterfeit article detection is provided, in accordance with an aspect of the present invention. In FIG. 5, an exemplary operating environment for implementing embodiments described herein is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not as clear, and metaphorically, the lines are blurred. For example, one may consider a presentation component such as a display device to be an I/O component. Also, processors have memory. The diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated as within the scope of FIG. 5 and when referencing the "computing device."

Computing device 500 typically includes a variety of computer-readable media and/or computer storage media. Computer-readable media can be any available media that can be accessed by computing device 500 and includes both volatile and nonvolatile media, removable and non-removable media. By way of example, and not limitation, computer-readable media may comprise computer storage media and communication media and/or devices. Computer storage media may include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not include signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc. I/O ports 518 allow computing device 500 to be logically coupled to other devices including I/O components 520, some of which may be built in. Illustrative components include a microphone, joystick, game pad, satellite dish, scanner, printer, wireless device, and the like.

Figure 6:
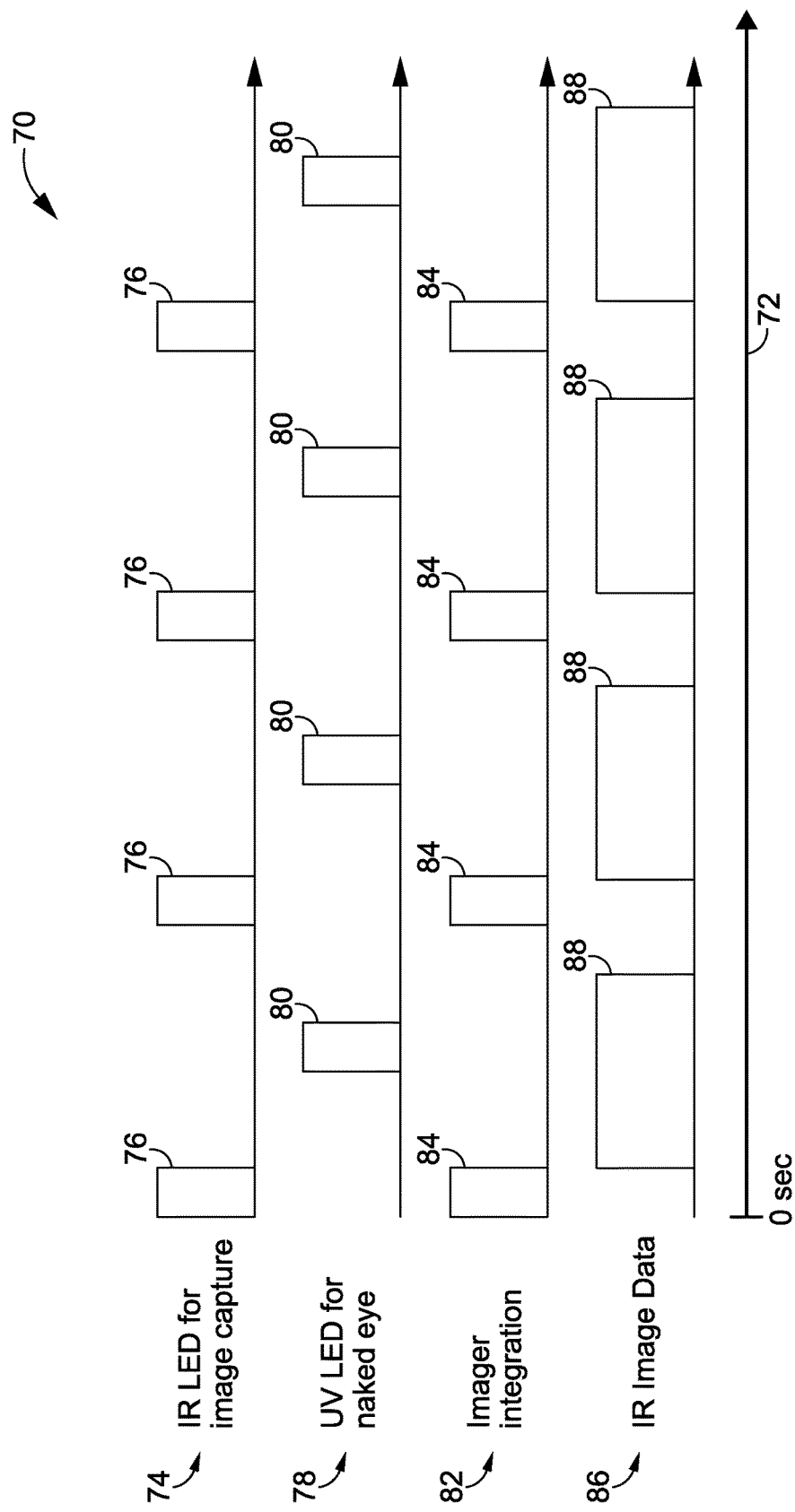
FIG. 6 is a first graphical representation of the capturing and processing of images with an image capturing device for counterfeit article detection, in accordance with an aspect of the present invention.

Referring now to FIG. 6, a first graphical representation 70 of the capturing and processing of images with an image capturing device for counterfeit article detection is provided, in accordance with an aspect of the present invention. In FIG. 6, the timing of image-capture and rendering for article analysis is depicted in a series of sub-graphical representations 74, 78, 82, 86. A time axis 72 is provided along a bottom of the graphical representation 70 to show the passage of time relative to the activity on each of the sub-graphical representations 74, 78, 82, 86. In FIG. 6, the first sub-graphical representation 74 is provided for indicating a timing of activation of infrared emitting elements (which in this case are identified as infrared LEDs). The blocks 76 indicate the times at which the infrared LEDs are illuminated for providing an infrared wavelength based illumination of an article for capture by the image capture device. A second sub-graphical representation 78 is provided for indicating a timing of activation of ultraviolet emitting elements (which in this case are ultraviolet LEDs). The blocks 80 indicate the times at which the ultraviolet LEDs are illuminated for providing an ultraviolet wavelength based illumination of an article for user visual verification. A third sub-graphical representation 82 is provided for showing integration of the images for presentation to a user of the device. The blocks 84 indicate the times at which the image is integrated, which in FIG. 6, is only at the times corresponding to the infrared emissions. A fourth sub-graphical representation 86 is provided for showing the rendered infrared image data for presentation to a viewer, with blocks 88 corresponding to the time periods for presenting the rendered image data readout.

Figure 7:
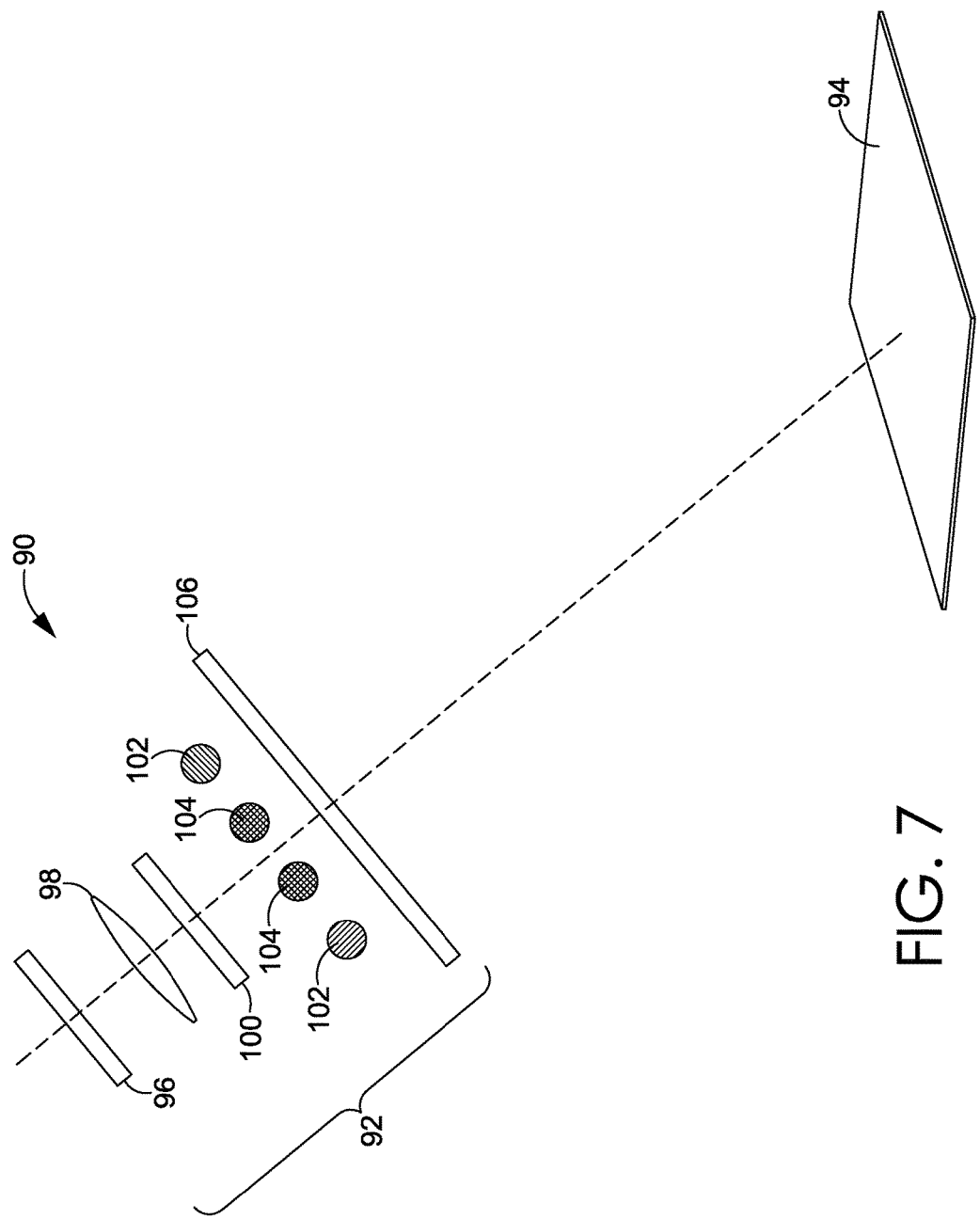
FIG. 7 is an exemplary optical arrangement of an image capturing device for counterfeit article detection, in accordance with an aspect of the present invention.

Referring now to FIG. 7, an exemplary optical arrangement 90 of an image-capturing device for counterfeit article detection is provided, in accordance with an aspect of the present invention. In FIG. 7, an image capturing chamber 92 is depicted capturing an image of a currency test note 94 on a surface. The image capturing chamber 92 includes an imager 96 for generating images from optical wavelengths received in the image capturing chamber 92, a lens 98, an optical long pass filter 100 (which may be a coating on the lens 98) to stop ultraviolet to the imager 96 to increase image contrast of security features under ultraviolet illumination since the ultraviolet security features are color visible light radiation stimulated by ultraviolet light, a first grouping of wavelength emitting elements 102 (e.g., LEDs), a second grouping of wavelength emitting elements 104, and a window 106. The wavelength emitting elements 102, 104, which may produce distinct and separate wavelengths (red, infrared, ultraviolet, etc.), may be activated in an alternating or separated fashion (e.g., infrared wavelengths may be emitted from elements 102 along with an associated infrared image capture by the imager 96, and subsequently ultraviolet wavelengths may be emitted from elements 104 along with an associated ultraviolet image capture by the imager 96, etc.). As the wavelength emitting elements 102, 104 are activated separately, and the imager 96 captures the separate images generated by the emitted wavelengths reflected from the currency test note 94, a rapidly generated series of images with different illuminated properties may be provided to a computing device for superimposing to generate a consolidated image showing all of the security features highlighted for comparison against an authentic associated currency image.

Figure 8:
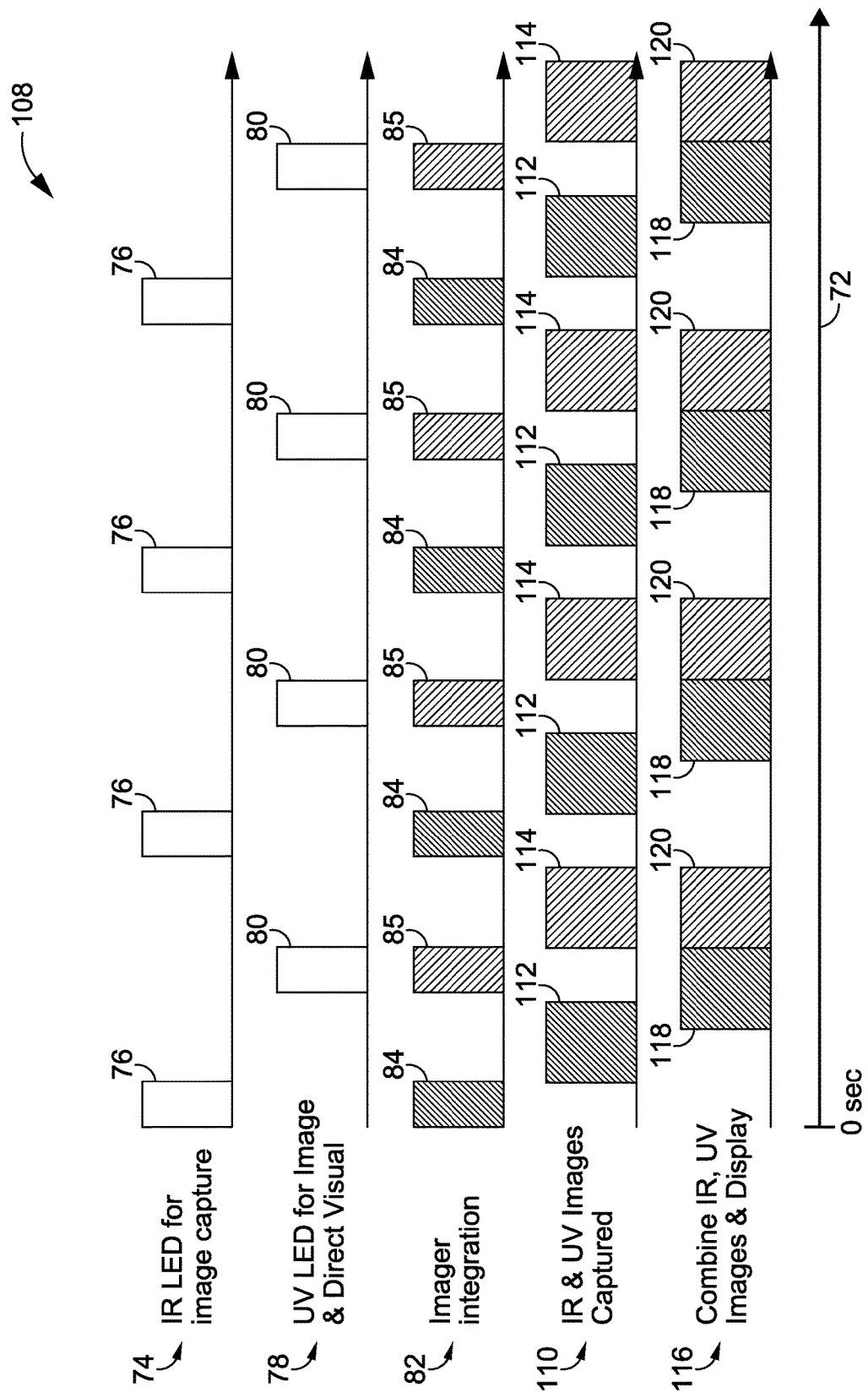
FIG. 8 is a second graphical representation of capturing and processing of images with an image capturing device for counterfeit article detection, in accordance with an aspect of the present invention.

Referring now to FIG. 8, a second graphical representation 108 of the capturing and presenting of images with an image capturing device for counterfeit article detection is provided, in accordance with an aspect of the present invention. In FIG. 8, the timing of image capture and rendering of images for article analysis is depicted. A time axis 72 is provided along a bottom of the graph 108 in FIG. 8. Additionally, a first sub-graphical representation 74 is provided for indicating a timing of activation of infrared emitting elements (which in this case are identified as infrared LEDs). The blocks 76 indicate the times at which the infrared LEDs are illuminated for providing an infrared wavelength based illumination of a currency test note for capture by the image capture device. A second sub-graphical representation 78 is provided for indicating a timing of activation of ultraviolet emitting elements (which in this case are identified as ultraviolet LEDs). The blocks 80 indicate the times at which the ultraviolet LEDs are illuminated for providing an ultraviolet wavelength based illumination of an object for capture by an image capturing device and user visual verification. A third sub-graphical representation 82 is provided for showing integration of the images for presentation. The blocks 84, 85 indicate the times at which the image is integrated, which in FIG. 8, is both of the times corresponding to the infrared emissions 84 and also the ultraviolet emissions 85, such that both the infrared and the ultraviolet emissions 84, 85 are integrated. A fourth sub-graphical representation 110 is provided for showing the timing of the capture of infrared images and ultraviolet images, which occur at separate times, as shown by infrared image capture blocks 112 and ultraviolet image capture blocks 114. By capturing the images at different times in alternating fashion, two images illuminating separate security features may be produced from the same image capturing device. A fifth sub-graphical representation 116 is provided for showing the timing and combination of the captured infrared and ultraviolet images for display at selected infrared time blocks 118 and ultraviolet time blocks 120. The images may be captured, and alternated, to present the alternating images at a frame rate of 25-80 frames per second (e.g., 80 frames per second with 40 frames of infrared images and 40 frames of ultraviolet images alternated with each other).

Figure 9:
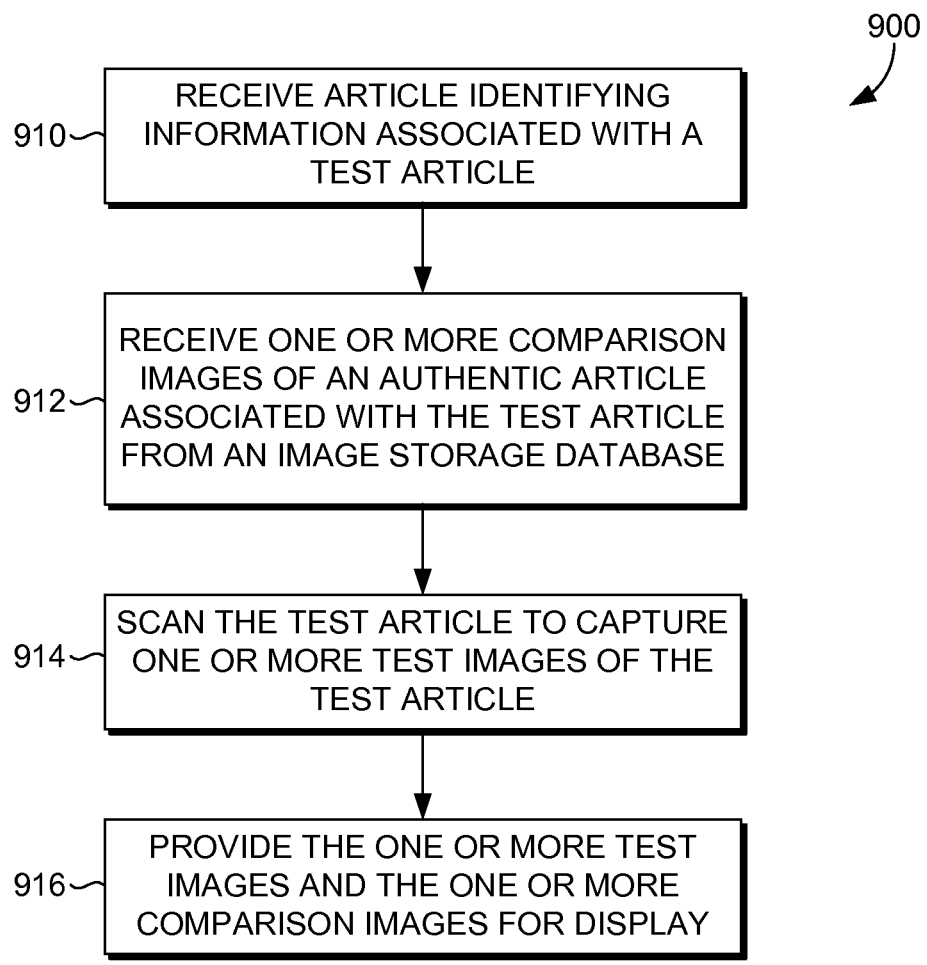
FIG. 9 is a block diagram of an exemplary method of using a scanner for counterfeit article detection, in accordance with an aspect of the present invention.

Referring now to FIG. 9, a block diagram 900 of an exemplary method of using a scanner for counterfeit article detection is provided, in accordance with an aspect of the present invention. In FIG. 9, at a first block 910, article-identifying information associated with a test article, such as year and/or denomination for a currency note if a currency note is being tested, is received. At a second block 912, one or more comparison images of an authentic article associated with the test article are received from an image storage database. At a third block 914, the test article is scanned to capture one or more test images of the test article. At a fourth block 916, the one or more test images and the one or more comparison images are provided for display.

Figure 10:
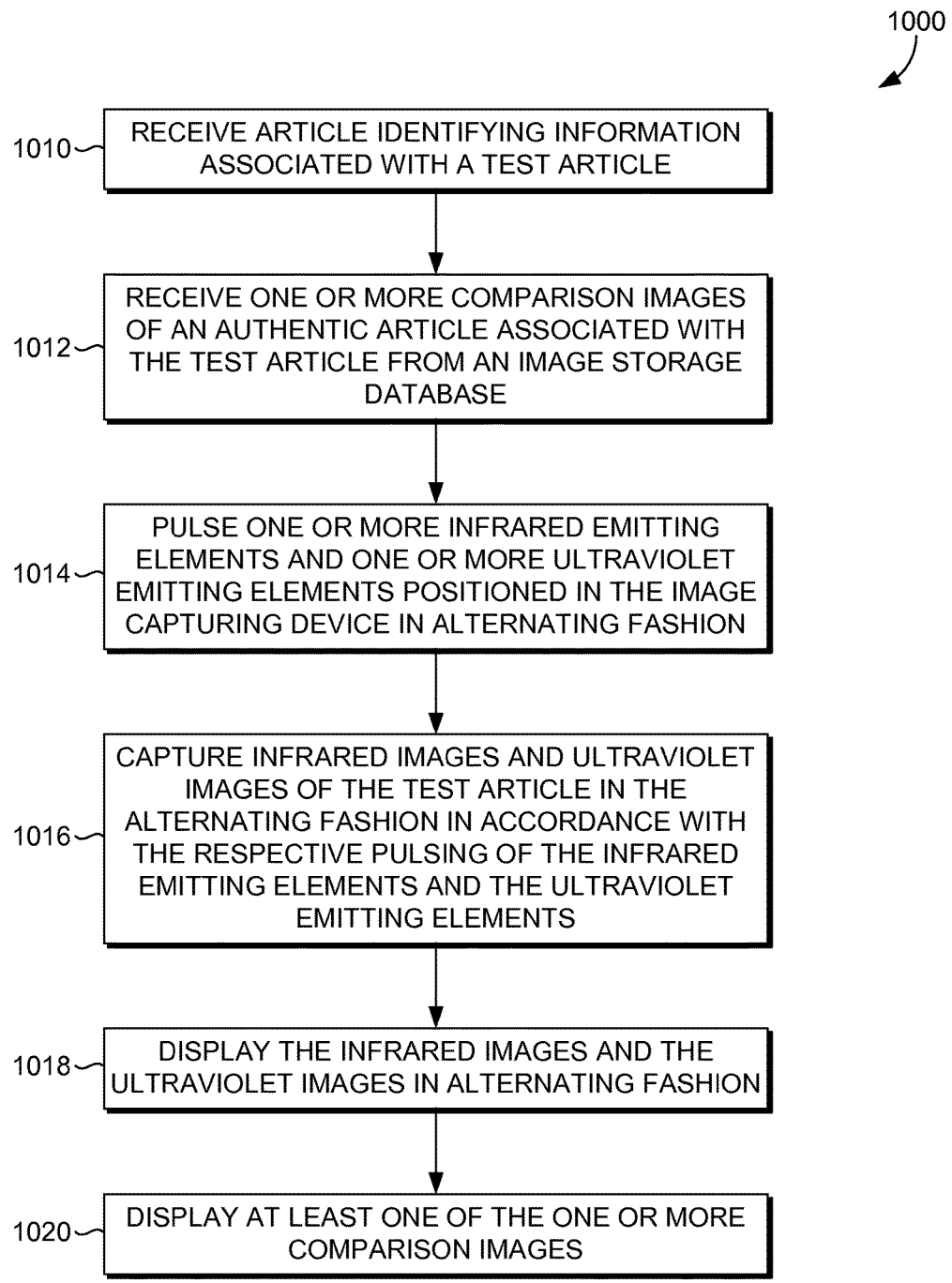
FIG. 10 is a block diagram of an exemplary method of using an image capturing device for counterfeit article detection, in accordance with an aspect of the present invention.

Referring now to FIG. 10, a block diagram 1000 of an exemplary method of using an image capturing device for counterfeit article detection is provided, in accordance with an aspect of the present invention. In FIG. 10, at a first block 1010, article-identifying information associated with a test article is received. At a second block 1012, one or more comparison images of an authentic article associated with the test article are received from an image storage database. At a third block 1014, one or more infrared emitting elements and one or more ultraviolet emitting elements positioned in the image capturing device are pulsed in an alternating fashion. At a fourth block 1016, infrared images and ultraviolet images of the test article are captured in the alternating fashion in accordance with the respective pulsing of the infrared emitting elements and the ultraviolet emitting elements. At a fifth block 1018, the infrared images and the ultraviolet images are displayed in alternating fashion. At a sixth block 1020, at least one of the one or more comparison images are displayed.

In additional embodiments, when the device is incorporated into a barcode scanner or ICD to provide article verification capability for the barcode scanner or ICD, a cashier or user of the scanner/ICD may use the scanner or the ICD in the standard scanning or capturing mode, and begin the currency verification process by setting the barcode scanner/ICD to article identification and/or verification mode. In this regard, the scanner/ICD may receive an input indicating activation of article verification mode through a button input, host command input, or other activation input. The blocks of FIGS. 9 and 10, as well as other steps for article verification and determination of authenticity of the test article against pre-authenticated articles via stored authentic article images, may be utilized. Additionally, at the conclusion of the article verification, an input may be received (e.g., button, host command, etc.) to return the scanner/ICD to normal scanning and/or image capturing mode. This transition may also occur after a pre-determined amount of time.

Figure 11A:
FIG. 11A is a monochrome/infrared image under infrared illumination of a currency note produced by an image capturing device for counterfeit article detection, in accordance with an aspect of the present invention.
Figure 11B:
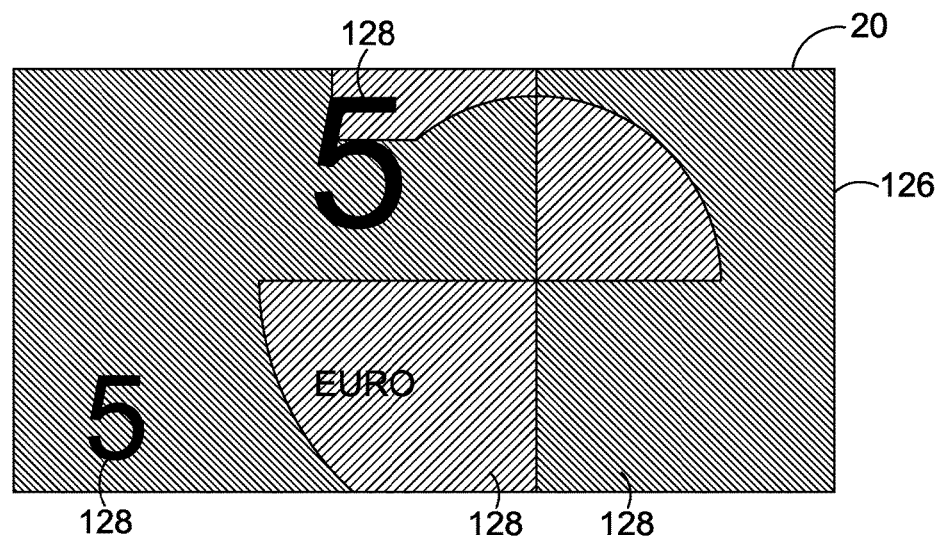
FIG. 11B is an image under ultraviolet illumination of the currency note of FIG. 11A produced by an image capturing device for counterfeit article detection, in accordance with an aspect of the present invention.

Referring now to FIGS. 11A and 11B, multiple images of a currency note 20 are provided with various security features illuminated. In FIG. 11A, a monochrome/infrared image 122 of the currency note 20 produced by an image capturing device for counterfeit article detection is provided, in accordance with an aspect of the present invention. The monochrome/infrared image 122 includes an illuminated infrared security feature 124 (the number "5") which may be compared against an image of an authentic bill with the same security feature highlighted. In FIG. 11B, an ultraviolet image 126 of the currency note 20 produced by the image capturing device for counterfeit article detection is provided, in accordance with an aspect of the present invention. The ultraviolet image 126 includes illuminated ultraviolet security features 128 which may be compared against a note that is authentic with the same security features highlighted.

Figure 12:
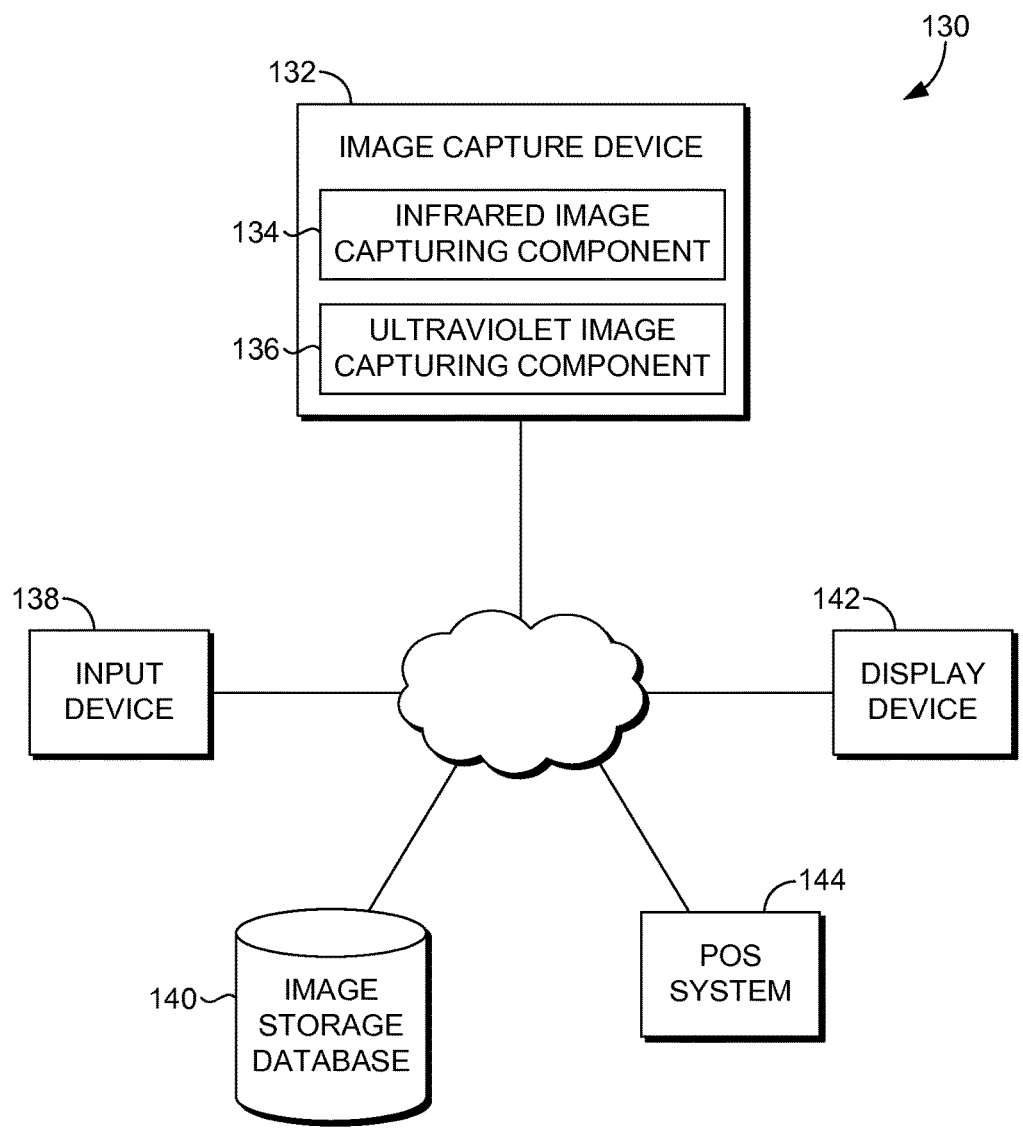
FIG. 12 is an exemplary system for counterfeit article detection, in accordance with an aspect of the present invention.

Referring now to FIG. 12, an exemplary system 130 for counterfeit article detection is provided, in accordance with an aspect of the present invention. In FIG. 12, the system 130 is depicted including an image capturing device 132, which may be the scanner depicted in FIG. 1, that includes an infrared image capturing component 134 and an ultraviolet image capturing component 136. An input device 138, which may be a keyboard, touch screen, or other digital or hardware interface, is also provided. An image storage database 140 is provided, which may be used to store and retrieve authentic article images (e.g., currency note images, check images, documents images, object images, etc.) for comparison with test articles for which images are captured by the image-capturing device 132. Additionally, a display device 142 is provided for displaying one or more test article images captured with the infrared component and/or the ultraviolet component, and also for displaying the authentic article images. Additionally, a point-of-sale (POS) device 144 is provided, at which a sale or a transaction may occur.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated as within the scope of the claims.

What is claimed is:

1. A method of detecting a counterfeit article with a scanning device, the method comprising:
   receiving article identifying information associated with a test article;
   receiving one or more comparison images of an authentic article associated with the test article from an image storage database;
   scanning the test article to capture test images comprising at least a first infrared image and a second ultraviolet image captured in alternating fashion; and
   providing the test images and the one or more comparison images for display,
      wherein the scanning device includes infrared LEDs and ultraviolet LEDs that may be controlled separately,
      wherein the infrared LEDs and the ultraviolet LEDs are positioned within a single camera chamber, and
      wherein the first infrared image is captured with illumination from the infrared LEDs and the second ultraviolet image is captured with illumination from the ultraviolet LEDs.

2. The method of claim 1, wherein the test article is currency, and wherein the article identifying information is at least one of:
   a currency value;
   a currency year; and
   a currency type.

3. The method of claim 1, wherein the one or more comparison images of the authentic article are determined and retrieved based at least in part on the article identifying information.

4. The method of claim 1, wherein the test article includes a first side and a second side, and wherein the test images comprise a series of images capturing the first side and the second side.

5. The method of claim 1, wherein the scanning device is a top-down image scanner.

6. The method of claim 1, wherein the article identifying information is received at an input device, the input device comprising at least one of:
   a keyboard;
   a touch screen; and
   a graphical user interface.

7. A method of detecting a counterfeit article with an image capturing device, the method comprising:
   receiving article identifying information associated with a test article;
   receiving one or more comparison images of an authentic article associated with the test article from an image storage database;
   pulsing one or more infrared emitting elements and one or more ultraviolet emitting elements positioned in the image capturing device in alternating fashion;
   capturing infrared images and ultraviolet images of the test article in the alternating fashion in accordance with the respective pulsing of the infrared emitting elements and the ultraviolet emitting elements;
   displaying the infrared images and the ultraviolet images in alternating fashion; and
   displaying at least one of the one or more comparison images.

8. The method of claim 7, wherein the image capturing device comprises red wavelength emitting elements, wherein the red, infrared, and ultraviolet emitting elements are configured to be controlled separately.

9. The method of claim 7, wherein the image capturing device includes an optical long pass filter.

10. The method of claim 7, wherein the image capturing device is configured for at least one of color and monochrome image processing.

11. The method of claim 7, wherein the infrared images and the ultraviolet images are displayed in the alternating fashion to provide a frame rate of 25-80 frames per second.

12. A system for detecting counterfeit articles, the system comprising:
- an image capturing device having one or more infrared emitting elements and one or more ultraviolet emitting elements which are configured to be operated independently, the image capturing device configured to capture images under infrared and ultraviolet illumination in alternating fashion;
- an image storage database for storing one or more images of authentic articles;
- an input device for receiving article identifying information associated with a test article, the article identifying information used for retrieving an image of an associated authentic article from the image storage database; and
- a display device for displaying one or more of the captured infrared images and the captured ultraviolet images of the test article and for displaying the image of the associated authentic article for comparison.

13. The system of claim 12, wherein an infrared image and an ultraviolet image are captured continuously by the image capturing device in the alternating fashion, and wherein the captured infrared images and the captured ultraviolet images are displayed in the alternating fashion on the display device.

14. The system of claim 13, wherein the captured infrared images and the captured ultraviolet images are displayed on the display device in the alternating fashion to provide a frame rate of 25-80 frames per second, and wherein the captured infrared images and the captured ultraviolet images are provided at the same location on the display device.

15. The system of claim 12, wherein the image capturing device further comprises a red wavelength emitting element, and wherein the red, infrared, and ultraviolet emitting elements are LEDs that are configured to be controlled independently.

16. The system of claim 12, wherein the one or more infrared emitting elements and the one or more ultraviolet emitting elements are contained within a single camera chamber of the image capturing device.

17. The system of claim 12, wherein the display device is configured to display the infrared image and the ultraviolet image captured by the image capturing device concurrently.

* * * * *